(12) United States Patent
Urciuoli

(10) Patent No.: US 11,342,854 B1
(45) Date of Patent: May 24, 2022

(54) VOLTAGE STEP-UP CONVERTER CIRCUITS FOR LOW INPUT VOLTAGES

(71) Applicant: U.S. Army Combat Capabilities Development Command, Army Research Laboratory, Adelphi, MD (US)

(72) Inventor: Damian P. Urciuoli, Bowie, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/126,256

(22) Filed: Dec. 18, 2020

(51) Int. Cl.
*H05B 45/38* (2020.01)
*H02M 3/335* (2006.01)
*H05B 45/385* (2020.01)

(52) U.S. Cl.
CPC ........ *H02M 3/33569* (2013.01); *H05B 45/38* (2020.01); *H05B 45/385* (2020.01)

(58) Field of Classification Search
CPC ............. H05B 45/385; H05B 45/3725; H02M 3/3381; H02M 3/33523; H02M 3/33569; H02M 3/33507
See application file for complete search history.

(56) References Cited

U.S. PATENT DOCUMENTS

| | | | |
|---|---|---|---|
| 8,411,467 B2 | 4/2013 | Rubio et al. | |
| 9,723,659 B2 | 8/2017 | Makosinski et al. | |
| 10,044,218 B2 | 8/2018 | Tiefnig | |
| 10,178,713 B2 | 1/2019 | Makosinski et al. | |
| 10,396,674 B2 * | 8/2019 | Lin | H02M 1/08 |
| 10,536,072 B2 | 1/2020 | Desai et al. | |
| 2005/0041437 A1 | 2/2005 | Chian et al. | |
| 2008/0291702 A1 * | 11/2008 | Hosotani | H02M 3/33569 363/21.02 |
| 2010/0060231 A1 | 3/2010 | Trainor et al. | |
| 2010/0321964 A1 * | 12/2010 | Brinlee | H02M 3/33507 363/21.18 |
| 2013/0182464 A1 | 7/2013 | Woias | |
| 2014/0226367 A1 * | 8/2014 | Hu | H02M 3/33569 363/21.04 |
| 2014/0362613 A1 * | 12/2014 | Park | H02M 1/34 363/21.16 |

(Continued)

OTHER PUBLICATIONS

Ultralow voltage step-up converter and power manager. Analog Devices, Inc., LTC3108 datasheet, Rev D, Mar. 2019.

(Continued)

*Primary Examiner* — Tung X Le
(74) *Attorney, Agent, or Firm* — Eric B. Compton

(57) ABSTRACT

Novel voltage converter circuits are provided which step-up very low DC input voltages to higher voltages capable of supporting low-power loads. According to embodiments, a voltage step-up power converter circuit may be formed of an oscillator sub-circuit which receives a DC voltage and outputs an AC voltage; a voltage doubler sub-circuit which receives the AC voltage and outputs an augmented AC voltage; and a voltage step-up converter sub-circuit which receives the augmented AC voltage, as a control voltage, and the initial DC voltage and outputs a voltage which is more than the initial DC voltage. These circuits allow electrical energy to be harvested from very low voltage sources and to convert it as efficiently as possible to run a load.

17 Claims, 4 Drawing Sheets

(56) References Cited

U.S. PATENT DOCUMENTS

2017/0317594 A1* 11/2017 Lind ............... H02M 7/003
2018/0177009 A1*  6/2018 Zhang ............. H02M 3/33507
2018/0287484 A1* 10/2018 Braginsky ......... H02S 40/36

OTHER PUBLICATIONS

Wikipedia entry for "Hartley Oscillator," available online at: https://en.wikipedia.org/wiki/Hartley_oscillator (accessed Dec. 9, 2020).
Wikipedia entry for "Voltage Doubler," available online at: https://en.wikipedia.org/wiki/Voltage_doubler (accessed Dec. 9, 2020).
Wikipedia entry for "Flyback Converter," available online at: https://en.wikipedia.org/wiki/Flyback_converter (accessed Dec. 9, 2020).
Ray Ridley, "Tapped Boost Converter Modeling," dated Oct. 10, 2013, available online at: https://www.powersystemsdesign.com/articles/tapped-boost-converter-modeling/18/5482.

* cited by examiner

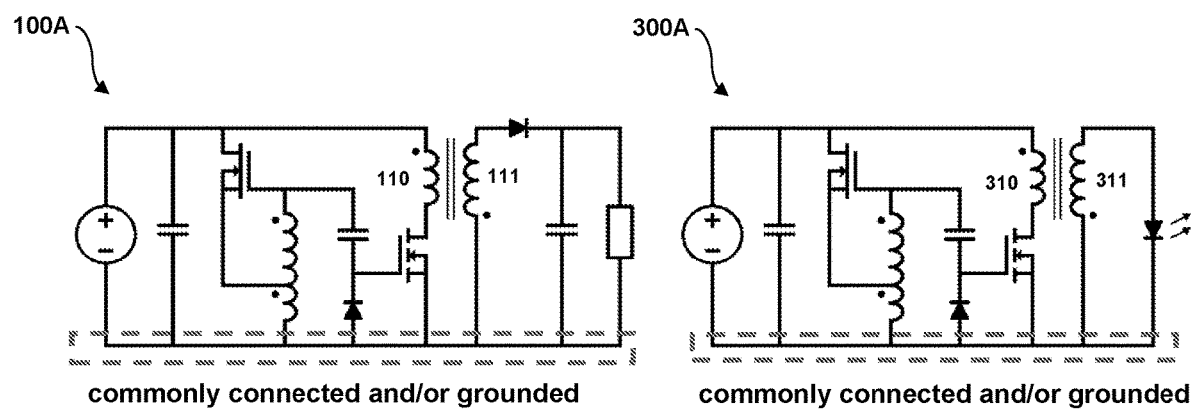
commonly connected and/or grounded        commonly connected and/or grounded
FIGURE 4A                                  FIGURE 4B
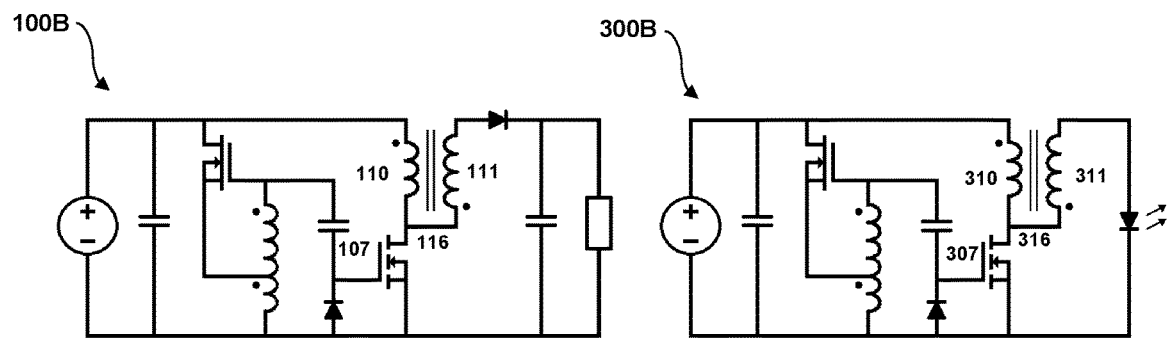
FIGURE 5A                                  FIGURE 5B

VOLTAGE STEP-UP CONVERTER CIRCUITS FOR LOW INPUT VOLTAGES

GOVERNMENT INTEREST

The invention described herein may be manufactured, used, and licensed by or for the United States Government.

BACKGROUND OF THE INVENTION

I. Field

The field of the invention relates to electrical power conversion, and more particularly to, novel voltage step-up converter circuits for low input voltages.

II. Description of Related Art

In many systems, it is desirable to convert electrical power from very low-voltage sources to operate loads at higher voltages. One such application is converting electrical power from thermoelectric generator (TEG) modules providing low voltages resulting from operation across low-temperature differences. TEG modules are generally comprised of several thermoelectric elements electrically connected in series between two thermal plates. The open-circuit voltage of a TEG module is proportional to the number of thermoelectric junctions and the temperature difference across its thermal plates.

However, a tradeoff exists between parameters of electrical resistance and open-circuit voltage for TEG modules, as the number of thermoelectric elements is varied with the other module parameters kept constant. For a specific plate area, module thickness, and material set, as the number of thermoelectric elements is increased, the cross-sectional area of each element must be reduced to maintain the same module plate area. So, while the open-circuit voltage of the TEG module increases due to the additional thermoelectric junctions, the electrical resistance of the TEG module increases due to both the reduced cross-section of each thermoelectric element and the additional series-connected elements. Higher resistances reduce the maximum output power of the TEG module. Therefore, TEG modules are often selected to have relatively low numbers of thermoelectric junctions, and correspondingly low output voltages.

Additionally, low temperature differences across TEG modules, can result in voltages on the order of tens of millivolts. Electrical power converters having large voltage-conversion ratios (output voltage divided by input voltage) are needed to step-up these very low voltages to much higher voltages (on the order of volts) to provide useable power to various loads.

SUMMARY OF THE INVENTION

Novel power-converter circuits are provided for and described herein which step-up very low DC input voltages to higher voltages capable of supporting low-power loads. For instance, they can operate with high voltage-step-up ratios, from input voltages on the order of a few tens of millivolts, while providing relatively high electrical efficiencies. Indeed, they may allow electrical power to be harvested from very low-voltage sources and to convert the power as efficiently as possible to run a load. The function thus may allow conversion of power that is in an ineffective form and therefore generally wasted, to a useful form.

According to various embodiments, a voltage step-up converter circuit is provided. It is formed of a novel and unique combination of sub-circuits. The sub-circuits may share or otherwise use some of the same elements. More particularly, a voltage step-up converter circuit is formed of an oscillator sub-circuit which receives a DC voltage and outputs an AC voltage; a voltage doubler sub-circuit which receives the AC voltage and outputs an augmented AC voltage; and a voltage step-up converter sub-circuit which receives the augmented AC voltage, as a control voltage, and the initial DC voltage, and outputs a voltage which is more than the initial DC voltage. The output voltage need not be DC and, depending on the circuit embodiment, could be DC or AC. In the case of the latter, its RMS value would be greater than the initial DC voltage.

The oscillator sub-circuit may be configured as a Hartley oscillator which includes a transistor, two inductors connected in series; a fixed or variable equivalent capacitance connected in parallel with the two inductors, and wherein a feedback signal to the transistor needed for oscillation is provided by one of the inductors. In some implementations, the two inductors connected in series may be provided by a coupled inductor or a tapped inductor.

The voltage doubler sub-circuit may be configured as a Villard circuit which includes a diode and a capacitor connected in series. It may shift the AC voltage it receives by providing a DC offset. By shifting the oscillator output voltage positively, the Villard circuit can enable the converter to step-up its input voltage by a factor greater than the turns-ratio of the coupled inductor in the voltage step-up converter sub-circuit, resulting in higher output voltages. Furthermore, the gate of the transistor of the step-up converter sub-circuit can be driven farther above its positive threshold voltage, thereby reducing its on-state resistance, resulting in higher converter efficiencies.

The voltage step-up converter sub-circuit includes: a coupled inductor having a primary winding and a secondary winding; a transistor connected to the primary winding; and a diode connected to the secondary winding. The voltage output of the voltage step-up converter sub-circuit may be a DC voltage, depending on the specific implementation of the step-up converter sub-circuit, and is more than the initial DC voltage. The voltage output of the voltage step-up converter sub-circuit is based on the ratio of winding turns of the primary and secondary windings of the coupled inductor, and on the duty cycle of the transistor or the duration of time the transistor is in the on-state. In some implementations, the inductively coupled primary and secondary windings are provided by a transformer. In some embodiments, the voltage step-up converter is configured as a flyback converter sub-circuit which includes a capacitor in series with the diode connected to the secondary winding. Here, a load is connected in parallel with the capacitor. The diode of the flyback converter sub-circuit comprises a reverse-blocking diode. In other embodiments, the diode of the voltage step-up converter sub-circuit may comprise a reverse blocking light-emitting diode (LED).

If electrical isolation of the input and output is not necessary, in some embodiments, the converter circuit connected to the primary winding of the voltage step-up converter sub-circuit and the converter circuit connected to the secondary winding of the voltage step-up converter sub-circuit may be connected together.

In some embodiments, the voltage step-up converter circuit may include a DC source, which outputs the initial DC voltage, and/or the load. The DC source may be a thermoelectric generator, a battery, or a PV cell, as non-limiting examples.

These and other embodiments of the invention are described in more detail below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments, including less effective but also less expensive embodiments which for some applications may be preferred when funds are limited. These embodiments are intended to be included within the following description and protected by the accompanying claims.

FIG. 4A shows a converter variant of FIG. 1 with a non-isolated flyback sub-circuit, and FIG. 4B shows a converter variant of FIG. 3 with a non-isolated output stage, according to further embodiments.

FIG. 5A shows a converter variant of FIG. 1 with a non-isolated tapped-inductor boost converter sub-circuit, and FIG. 5B shows a converter variant of FIG. 3 with a non-isolated tapped-inductor output stage, according to further embodiments.

DETAILED DESCRIPTION

Figure 1:
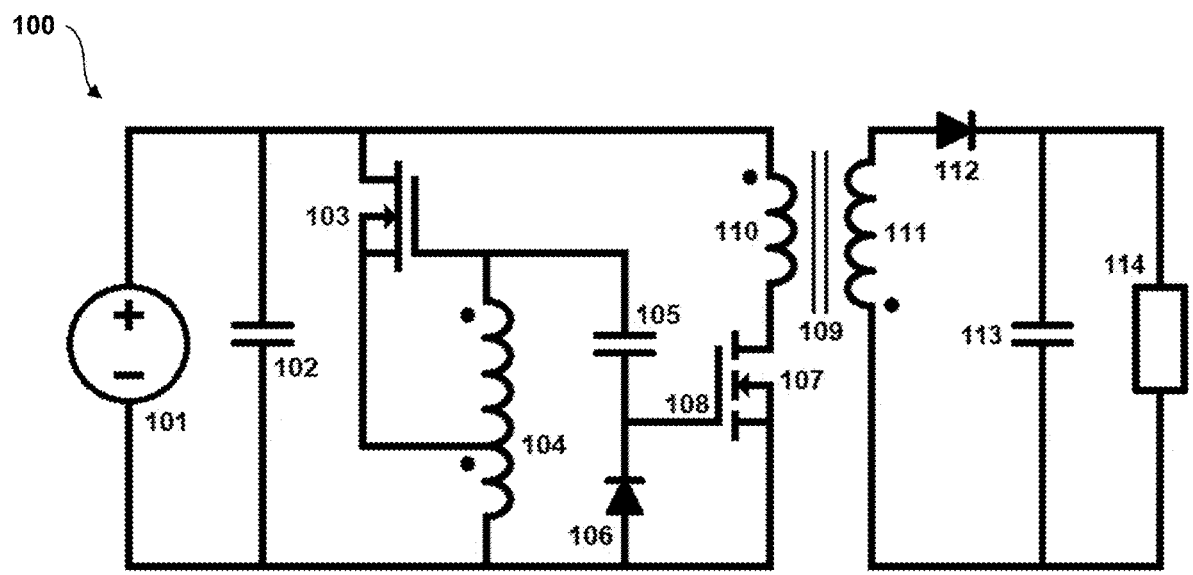
FIG. 1 is a circuit schematic of an embodiment of a voltage step-up power converter.
Figure 1A:
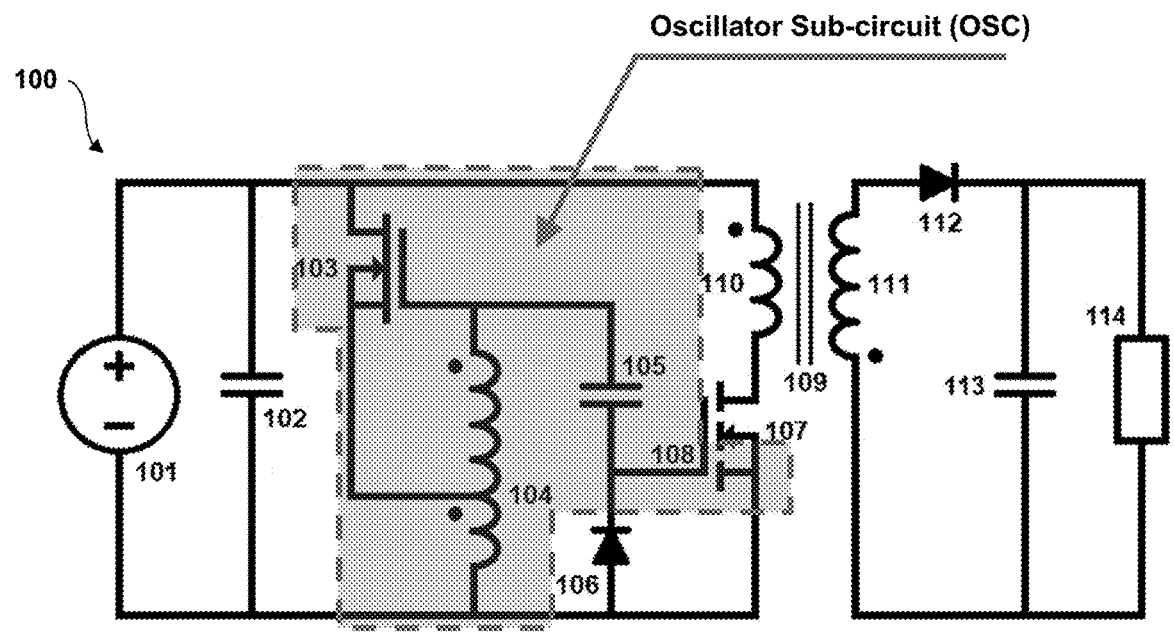
FIGS. 1A, 1B and 1C show the same converter circuit depicted in FIG. 1, but highlight the oscillator, voltage doubler and the voltage step-up converter sub-circuits, respectively, of the voltage step-up power converter.
Figure 1B:
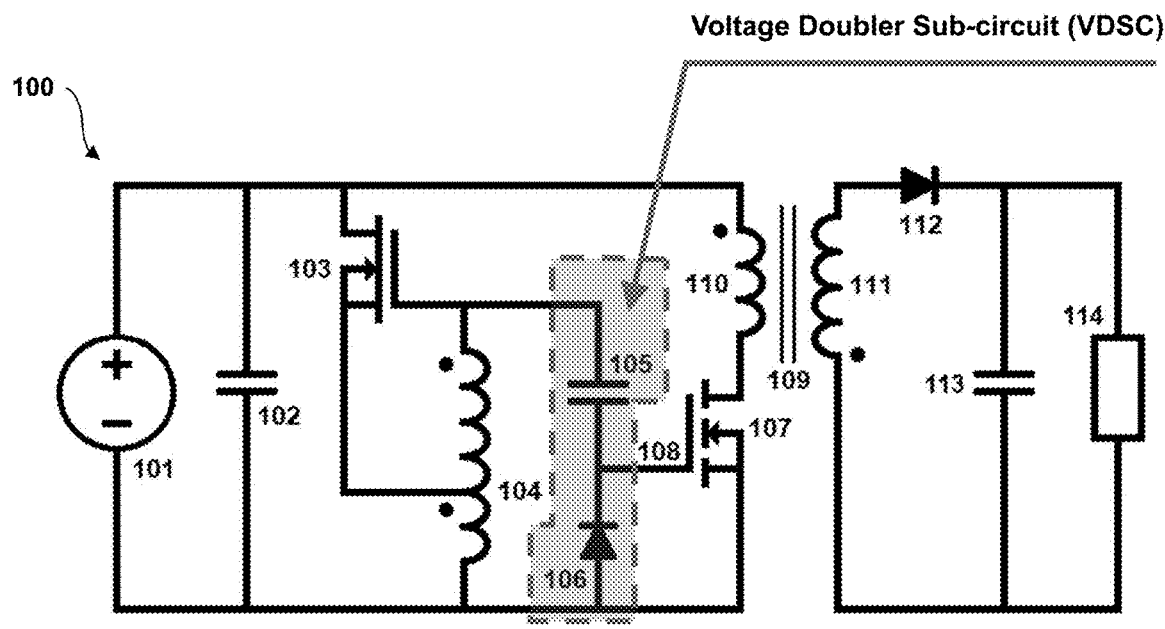
Figure 1C:
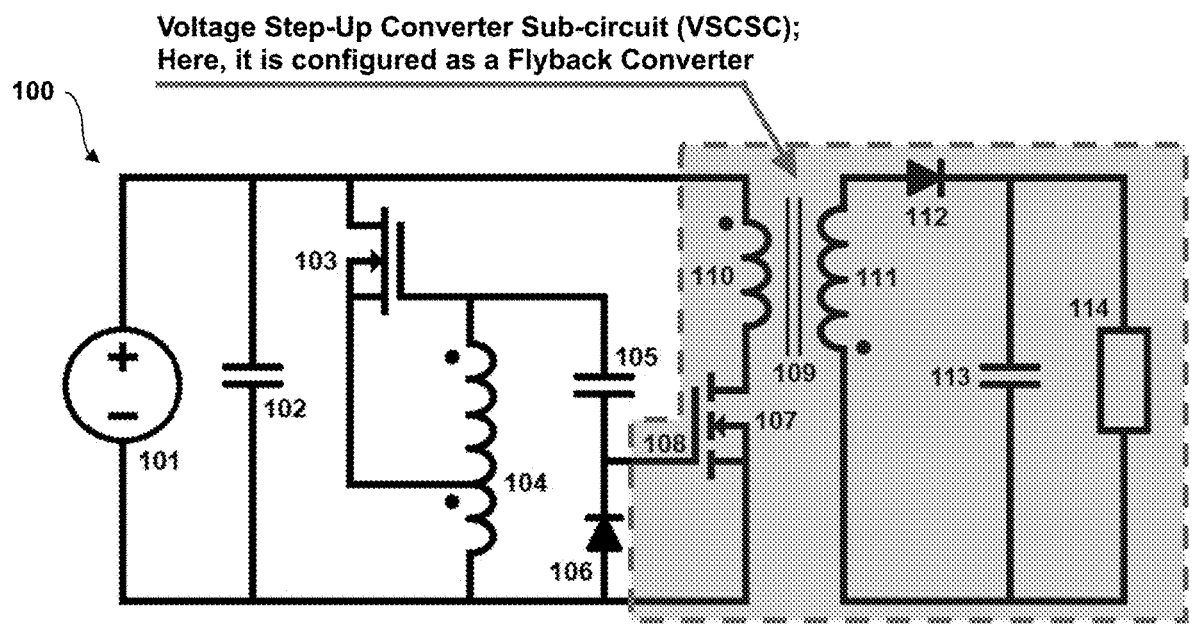

FIG. 1 is a circuit schematic of an embodiment of a voltage step-up power converter circuit (100). The converter circuit (100) is formed of a novel and unique combination of sub-circuits. Those sub-circuits include an oscillator sub-circuit (OSC), a voltage doubler sub-circuit (VDSC), and a voltage step-up converter sub-circuit (VSCSC). FIGS. 1A, 1B and 1C show the same converter circuit (100) depicted in FIG. 1. They just delineate the sub-circuits which are part of the converter circuit (100), where FIG. 1A highlights the oscillator sub-circuit (OSC), FIG. 1B highlights the voltage doubler sub-circuit (VDSC) and FIG. 1C highlights the voltage step-up converter sub-circuit (VSCSC). As will be appreciated, the sub-circuits share and use some of the same elements.

The sub-circuits of the converter circuit (100) may be configured as and/or operate as known circuits in some embodiments and implementations, such as a Hartley oscillator, a Villard voltage doubler circuit, a flyback converter, and a tapped-inductor boost converter. It should be appreciated that, while the description of this converter circuit refers to configurations of electrical components by their established names, i.e. Hartley oscillator, Villard voltage doubler circuit, flyback converter, and tapped-inductor boost converter, they are only intended to generally indicate the parts and type of function provided by each configuration. Indeed, the unique combination of the sub-circuits of the converter circuit (100) results in operation that differs from a superposition of the individual elements and operations of these configurations.

In some embodiments, the converter circuit (100) may include the DC voltage source (101) and a converter load (114). However, in others, the converter circuit (100) may be a stand-alone circuit which is intended to be used to connect the DC voltage source (101) and the converter load (114). The circuit (100) and its components could be fabricated as an integrated circuit. The DC voltage source (100), the load (114), or both, may connect to the converter circuit (100) by way of designated terminal connections, which could be fixed (such as with soldering) or permit with, relative ease, simple connection and disconnection (such as with plugs). The circuit (100) may be part of a converter device which might include a housing and other elements, like voltage/current measurement displays, heat sinks, fans, connectors, plugs, etc. (not shown), as are typical in many power converters.

Referring to the schematic of FIG. 1, a DC voltage source (101) outputs an initial DC voltage. The DC voltage source (101) may be a thermoelectric generator (TEG), a battery, or a photovoltaic (PV) cell, as non-limiting examples. The DC voltage may be a low DC input voltage, such as, on the order of tens of millivolts. That low DC voltage may be supported by a bypass capacitor (102) which may be provided to reduce voltage ripple of the initial DC voltage such that the ripple voltage is kept relatively small compared to the initial DC voltage. The initial DC voltage is input to the oscillator sub-circuit (OSC).

The oscillator sub-circuit (OSC) receives the DC voltage from the DC voltage source (101) and outputs an AC voltage. In some embodiments, as shown, the oscillator sub-circuit may be configured as a Hartley oscillator. The Hartley oscillator is an LC oscillator circuit that may be self-starting. With reference to FIG. 1A, the oscillator sub-circuit (OSC) includes a transistor (103), a coupled inductor (104) and a capacitance connected in parallel with the inductor (104). The capacitance may be fixed or variable as explained below. The combination of the inductor (104) and that capacitance forms an LC circuit.

The oscillator sub-circuit (OSC) uses a feedback signal for oscillation from the LC circuit to the transistor (103), functioning as an amplifier. The inductor (104) winding connected between the gate and source terminals of the transistor (103) provides an input signal to the transistor. The other (lower) inductor winding provides positive feedback with drain current of the transistor (103) flowing through it. This, in turn, causes the transistor (103) to amplify a sinusoidal voltage oscillation at a frequency determined by the inductance and capacitance parameters of the LC circuit. This amplified sinusoidal voltage is the AC voltage output of the oscillator sub-circuit. The transistor (103) may be a depletion-mode transistor or a normally-on transistor, such as a metal-oxide-semiconductor field-effect transistor (MOSFET) or a high-electron-mobility transistor (HEMT), for instance. Although a depletion-mode junction field effect transistor (JFET) could also be used in the oscillator sub-circuit (OSC) in place of the depletion-mode MOSFET (103), the gate-to-source diode inherent in the JFET device structure can forward conduct over a large portion of the oscillator output voltage range, resulting in significant distortion and attenuation of the oscillator output voltage.

In a preferred embodiment of the converter circuit (100), shown, a coupled-inductor (104), having three terminals, is included as part of the oscillator sub-circuit (OSC). The coupled inductor includes two separate windings that are connected in series, with the connection point between the two windings forming the third electrical terminal that connects to the source terminal of the MOSFET (103). Similarly, a coupled inductor may be implemented using a single winding having a tapped connection point which divides that winding into two smaller windings, each which may have the same number, or a different number of turns. The tap point may be connected to the source terminal of the MOSFET (103). It may also be possible to implement the oscillator sub-circuit (OSC) of the converter circuit (100) using a pair of series-connected discrete inductors without magnetic coupling in place of the coupled inductor (104).

The ratio of the number of turns for each winding of the coupled inductor, or the ratio of inductances of a pair of series-connected discrete inductors, affects the amplitude of the output voltage of the oscillator sub-circuit. To increase the amplitude of the output voltage of the oscillator sub-circuit (OSC), the coupled inductor (104) top winding connected between the gate and source terminals of the MOSFET (103) has a sufficiently higher number of turns than the other (lower) winding. For example, the ratio of the number of turns of the top winding to the number of turns of the bottom winding of the coupled inductor (104) may be on the order of tens, or hundreds, or higher.

The capacitance in the oscillator sub-circuit (OSC) may be provided by the series connection of a capacitor (105) and the input capacitance at the gate (108) of the transistor (107), which is part of the voltage step-up converter sub-circuit (VSCSC). The transistor (107) may be an enhancement-mode transistor or a normally-off transistor, such as a MOSFET or a HEMT, for example. Because the capacitor (105) is selected to be a fixed capacitor, its capacitance is effectively constant over its operating-voltage range. However, the input capacitance at the MOSFET gate (108) may vary more, in a relative manner, based on the electrical conditions of the MOSFET (107) during its switching cycle. The parasitic capacitances of the coupled inductor (104) windings also contribute to this resonant capacitance.

The voltage-doubler sub-circuit (VDSC) interacts with the AC voltage from the oscillator sub-circuit (OSC) and outputs an augmented AC voltage. With reference to FIG. 1B, the voltage-doubler sub-circuit (VDSC) is configured as a Villard voltage-doubler circuit formed of the capacitor (105) and a diode (106). Note that the capacitor (105) functions as part of both the oscillator sub-circuit (OSC), as previously discussed, and the voltage-doubler sub-circuit (VDSC), and is shown in the highlighted areas of FIGS. 1A and 1B. The capacitor (105) is charged with forward current through the diode (106) during the negative half cycles of the output voltage of the oscillator. The output voltage of the Villard voltage-doubler sub-circuit is provided at the cathode of the diode (106), with the output-voltage reference at the anode of the diode (106). Therefore, the output voltage of the Villard voltage-doubler sub-circuit is the reverse-blocking voltage of the diode (106). If the diode (106) is selected to have a low forward voltage during forward conduction, with respect to the amplitude of the oscillator voltage, the magnitude of the negative output voltage of the Villard voltage-doubler sub-circuit can be small compared to the magnitude of the positive output voltage of the sub-circuit. Thus, the effect of the Villard voltage-doubler sub-circuit is to shift the AC output voltage of the oscillator sub-circuit in the positive direction by a DC voltage nearly equal to the amplitude of the oscillator output voltage.

The gate (108) of the enhancement-mode MOSFET interacts with both the oscillator sub-circuit (OSC) and the voltage-doubler sub-circuit (VDSC). With reference to FIG. 1A, and as previously mentioned, the input capacitance at the gate (108) of the enhancement-mode MOSFET functions as part of the oscillator sub-circuit in a series connection with the capacitor (105). With reference to FIG. 1B, the input capacitance at the gate (108) is also connected to the cathode of the diode (106) at the output of the Villard voltage-doubler sub-circuit. Therefore, the input capacitance at the gate (108) provides a capacitive load to the voltage-doubler sub-circuit.

Figures 2A, 2B:
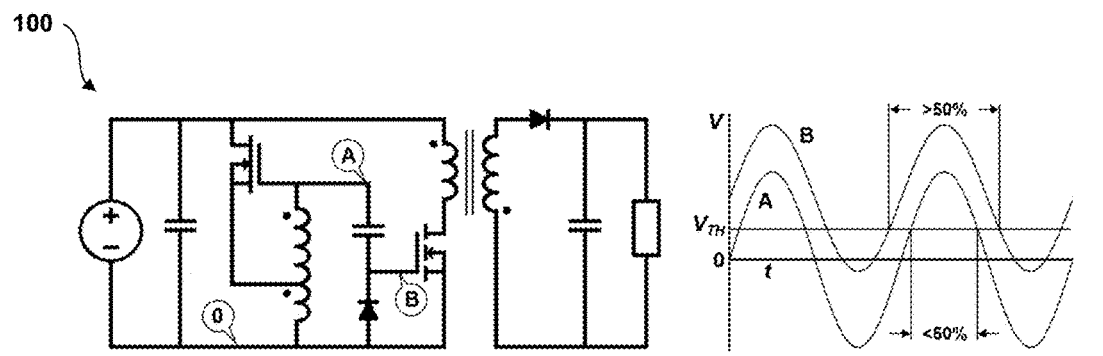
FIG. 2A identifies nodes of the oscillator sub-circuit output, the MOSFET gate, and their common voltage-reference point, depicted in FIG. 1.
FIG. 2B is a plot showing representative voltage-vs.-time waveforms at those locations.

FIG. 2A identifies nodes of the oscillator sub-circuit output (A), the MOSFET gate (108) (B), and their common voltage-reference point (0), depicted in FIG. 1. FIG. 2B is a plot showing representative voltage-vs.-time waveforms, of the oscillator output (A) and of the MOSFET gate (108) (B). The waveforms were generated by simulation of a converter circuit model. Also shown in FIG. 2B is a representative positive gate-threshold voltage (VTH) of an n-channel enhancement-mode MOSFET. Referring to FIG. 2B, the oscillator sub-circuit output voltage waveform (A) is a sinusoidal AC voltage with no DC offset. The voltage waveform at the MOSFET gate (108) (B) is also sinusoidal, but has a positive DC offset voltage provided by the voltage-doubler sub-circuit (VDSC). Although the voltage of the MOSFET gate (108) (B) is higher than the voltage of the oscillator output (A), the peak-to-peak voltage of the MOSFET gate (108) (B) is less than the peak-to-peak output voltage of the oscillator (A). The peak-to-peak voltage of the MOSFET gate (108) (B) is affected by the ratio of the capacitance of the capacitor (105) to the input capacitance at the MOSFET gate (108). Lower ratios result in lower peak-to-peak voltages of the MOSFET gate (108). For capacitances of the capacitor (105) selected to be significantly higher than the input capacitance at the MOSFET gate (108), the peak-to-peak voltage of the MOSFET gate (108) can be nearly equal to the peak-to-peak output voltage of the oscillator. For the voltage waveforms shown in the plot of FIG. 2B, a ratio of 5 to 1 was used in the circuit model for the ratio of capacitance of the capacitor (105) to the input capacitance at the MOSFET gate (108), respectively.

Referring to FIG. 2B, the portion of negative voltage at the MOSFET gate (108) in waveform (B) is a result of the forward voltage of the diode (106). Lower forward voltages for diode (106) result in minimum voltages that are less negative at the MOSFET gate (108), and shorter intervals of negative voltage at the MOSFET gate (108). To maximize the positive-voltage shift provided by the voltage doubler sub-circuit (VDSC), the forward voltage of the diode (106) should be minimized. The positive shift of the output voltage of the oscillator sub-circuit (OSC) provided by the voltage doubler sub-circuit (VDSC), allows the gate of the enhancement-mode MOSFET (108) to be driven farther above its positive threshold voltage, thereby reducing its on-state resistance, resulting in higher converter efficiencies. Furthermore, if the MOSFET (107) threshold voltage is below the midpoint of the voltage waveform at the MOSFET gate (108), the voltage step-up converter sub-circuit (VSCSC) can have duty cycles above 50%. This condition is satisfied by the voltage waveform (B) at the MOSFET gate (108) in FIG. 2B. For duty cycles above 50%, the voltage-conversion ratio of the voltage step-up converter sub-circuit (VSCSC)

exceeds the coupled-inductor (109) primary-to-secondary winding turns ratio, resulting in higher output voltages.

If the direction of the diode (106) in the Villard sub-circuit were to be reversed from what is shown in FIG. 2A, instead of the positive shift shown for waveform (B) in FIG. 2B, a negative shift of the oscillator voltage would result, with a lower negative peak voltage. Such a configuration might be used to drive the gate of a p-channel enhancement-mode MOSFET instead of an n-channel MOSFET in a flyback converter sub-circuit implementation having the positions of the MOSFET (107) and the primary winding (110) interchanged in other converter implementations.

The voltage step-up converter sub-circuit (VSCSC) receives the augmented AC voltage from the voltage doubler sub-circuit (VDSC) as well as the initial DC voltage from the DC voltage source (101). It uses the augmented AC voltage as a control voltage and outputs a voltage which is more than the initial DC voltage. The output voltage need not be DC and, depending on the circuit embodiment, could be DC or AC. In the case of the latter, its RMS value would be greater than the initial DC voltage.

With reference to FIG. 1C, the voltage step-up converter sub-circuit (VSCSC) includes a coupled inductor (109) having a primary winding (110) and a secondary winding (111). In some implementations, the primary and secondary windings of the coupled inductor may be provided a transformer. The drain of the MOSFET transistor (107) connects to the primary winding (110). A diode (112) connects to the secondary winding (111). The voltage output of the step-up converter sub-circuit is a multiple of the initial DC voltage based on the ratio of the number turns of the primary and secondary windings (110, 111) and on the duty cycle of the transistor (107) or the duration of time of the transistor (107) is in the on-state.

The oscillating output voltage of the voltage-doubler sub-circuit (VDSC) directly drives the gate (108) of the n-channel enhancement-mode MOSFET (107). The enhancement-mode MOSFET (107), in conjunction with the separate coupled inductor (109) having a primary-to-secondary winding turns ratio sufficiently greater than 1, increases or steps-up the low DC input voltage of the DC voltage source (101). For instance, a low DC input voltage on the order of tens of millivolts may increase to a much higher output (load) voltage on the order of volts.

In some embodiments, the voltage step-up converter sub-circuit (VSCSC) may be configured as a flyback converter sub-circuit to provide a DC output (load) voltage. The voltage step-up function may also be provided with an additional benefit of electrical isolation between the primary (110) and secondary (111) windings of the coupled inductor (109), as shown in FIG. 1C. When the voltage step-up converter sub-circuit (VSCSC) is configured as a flyback converter sub-circuit, as shown in FIG. 1C, it may include a capacitor (113) in series with the diode (112) connected to the secondary winding (111). The converter load (114) is connected in parallel with the capacitor. The capacitor (113) supports the load voltage and reduces the ripple of the DC output voltage of the voltage step-up converter sub-circuit (VSCSC), such that the ripple voltage is small with respect to the DC output voltage.

Figure 3:
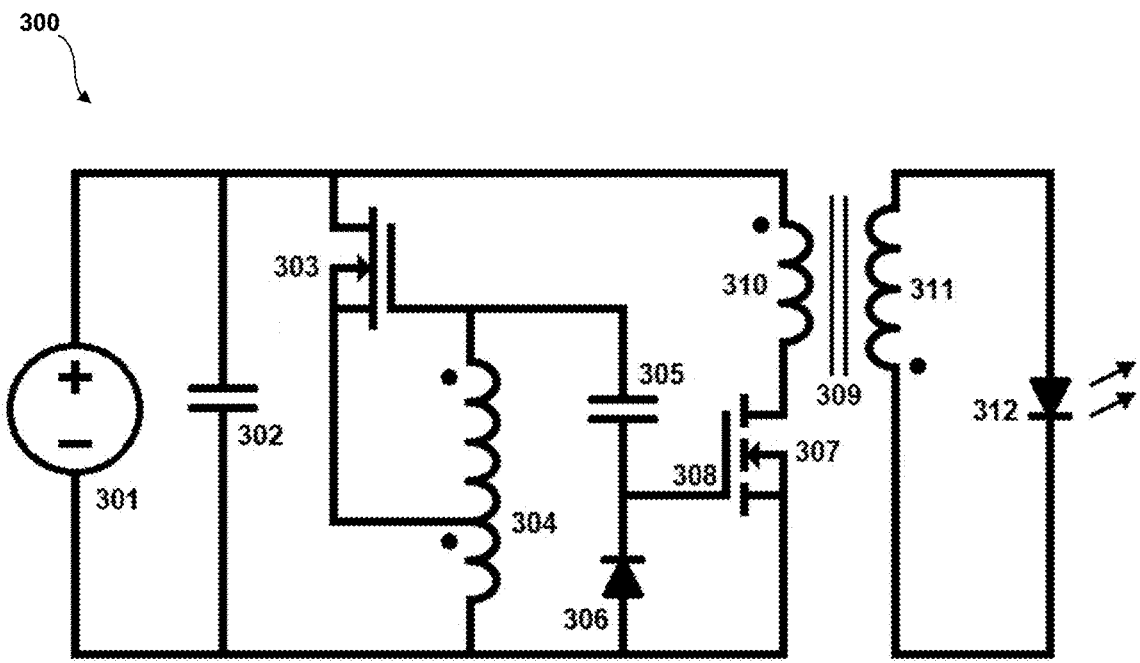
FIG. 3 is a circuit schematic of another variant of the voltage step-up converter circuit for an LED load.

FIG. 3 is a circuit schematic of another variant of a voltage step-up power converter circuit (300) for a light-emitting diode (LED) load, wherein the LED also provides the function of reverse-voltage blocking. The circuit (300) is similar to that shown in FIG. 1, except that the capacitor (113) and element (114) are removed, and the diode (112) is replaced with an LED (312). In this circuit, the LED (312) serves as both a rectifying diode and a load. The voltage step-up converter sub-circuit (VSCSC) no longer is configured as or functions as the flyback DC-DC converter configuration and the LED (312) does not operate at a DC voltage. Instead, the LED (312) is pulsed with forward voltage and current at the frequency of the oscillator sub-circuit (OSC). The LED (312) should have a sufficient rating for repetitive blocking of reverse voltage. This configuration of the converter output may result in higher efficiency and greater average power output to the LED (312) load than if the rectifying diode (112) of the converter circuit (100) of FIG. 1 is used.

The schematics of the converter circuits (100, 300) shown in FIGS. 1 and 3 depict the secondary inductor (111, 311), which is connected to the output of the converter, as being electrically isolated from the primary inductor (110, 310) to which it is magnetically coupled. Electrical isolation like this, however, may not be necessary in all implementations. FIG. 4A shows a converter variant (100A) of FIG. 1 with a non-isolated flyback sub-circuit, and FIG. 4B shows a converter variant (300A) of FIG. 3 with a non-isolated output stage, according to further embodiments. The secondary inductor (111, 311) may be connected to the source of MOSFET (107, 307) as shown in FIGS. 4A and 4B, respectively, to form a common reference point for the converter circuits. For instance, the portion of the converter circuit (100A, 300A) connected to the primary winding (110, 310) and the portion of the converter circuit connected to the secondary winding (111, 311) are commonly connected and/or grounded. Despite having this common reference point connection, the converter circuits of FIGS. 4A and 4B still prevent DC-fault-current from being drawn from the converter input-power source during a short-circuit condition at the converter output.

Other electrically-non-isolated converter embodiments are shown in FIGS. 5A and 5B, with the secondary winding (111) connected to the drain of the enhancement-mode MOSFET. FIG. 5A shows a converter variant (100B) of FIG. 1 with a non-isolated tapped-inductor boost sub-circuit, and FIG. 5B shows a converter variant (300B) of FIG. 3 with a non-isolated tapped-inductor output stage, according to further embodiments. The portion of the converter circuit (100B, 300B) connected to the primary winding (110, 310) and the portion of the converter circuit connected to the secondary winding (111, 311) may be connected directly. More particularly, a direct connection (116, 316) connects the drain of the MOSFET transistor (107, 307) connected to the primary winding (110, 310) directly to the secondary winding (111, 311). Unlike the converter circuits (100A, 300A) of FIGS. 4A and 4B, the output of the converter circuits (100B, 300B) of FIGS. 5A and 5B allow DC-fault-current to be drawn from the converter input-power source during a short-circuit condition at the converter output.

Embodiments of the novel voltage step-up converter circuit have been demonstrated. Indeed, prototypes of converter circuits have been built using discrete commercially-available components. The converters built can step-up DC input voltages as low as 20 mV. At a DC input voltage of 40 mV and a DC output voltage of 2.5 V, the converters have a power-conversion efficiency of greater than 55% at an output power of greater than 500 µW.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

While the foregoing is directed to embodiments of the present invention, other and further embodiments of the invention may be devised without departing from the basic scope thereof, and the scope thereof is determined by the claims that follow.

I claim:

1. A voltage step-up converter circuit comprising:
   an oscillator sub-circuit which receives a DC voltage and outputs an AC voltage;
   a voltage doubler sub-circuit which receives the AC voltage and outputs an augmented AC voltage; and
   a voltage step-up converter sub-circuit which receives the augmented AC voltage, as a control voltage, and the initial DC voltage and outputs a voltage which is more than the initial DC voltage.

2. The converter circuit of claim 1, wherein the oscillator sub-circuit is configured as a Hartley oscillator.

3. The converter circuit of claim 2, wherein the Hartley oscillator comprises: a transistor, two inductors connected in series; a fixed or variable equivalent capacitance connected in parallel with the series-connected inductors, and wherein a feedback signal to the transistor needed for oscillation is provided by one of the inductors.

4. The converter circuit of claim 3, wherein the two series-connected inductors are magnetically coupled and comprise a coupled inductor having two windings, or a tapped inductor having one tap point.

5. The converter circuit of claim 3, wherein the transistor comprises a depletion-mode transistor or a normally-on transistor.

6. The converter circuit of claim 1, wherein the voltage doubler sub-circuit is configured as a Villard circuit.

7. The converter circuit of claim 6, wherein the Villard circuit comprises a diode and a capacitor connected in series.

8. The converter circuit of claim 6, wherein the Villard circuit provides a DC offset to the AC voltage it receives.

9. The converter circuit of claim 1, wherein the voltage step-up converter sub-circuit comprises:
   a coupled inductor having a primary winding and a secondary winding;
   a transistor connected to the primary winding; and
   a diode connected to the secondary winding,
   wherein the voltage output of voltage step-up converter sub-circuit is more than the initial DC voltage and is based on the ratio of turns of the primary and secondary windings of the coupled inductor and on the duty cycle of the transistor or the duration of time the transistor is in an on-state.

10. The converter circuit of claim 9, wherein the coupled inductor comprises a transformer.

11. The converter circuit of claim 9, wherein the voltage step-up converter is configured as a flyback converter sub-circuit comprising: a capacitor in series with the diode connected to the secondary winding, wherein a load is parallel with the capacitor.

12. The converter circuit of claim 9, wherein the diode of the voltage step-up converter sub-circuit comprises a light-emitting diode (LED), which is capable of reverse-voltage blocking.

13. The converter circuit of claim 9, wherein the portion of the converter circuit connected to the primary winding and the portion of the converter circuit connected to the secondary winding are connected together.

14. The converter circuit of claim 9, wherein the transistor comprises an enhancement-mode transistor or a normally-off transistor.

15. The converter circuit of claim 1, further comprising a DC source which outputs the initial DC voltage.

16. The converter circuit of claim 15, wherein the DC source comprises a thermoelectric generator, a battery, or a PV cell.

17. The converter circuit of claim 1, further comprising a load.

* * * * *